2,926,126

PREPARATION OF GRAFT COPOLYMERS

Roger K. Graham, Moorestown, N.J., and Muriel S. Gluckman, Philadelphia, Pa., assignors to Rohm & Haas Company, Philadelphia, Pa., a corporation of Delaware No Drawing. Application January 13, 1956
Serial No. 558,833

8 Claims. (Cl. 204—158)

This invention concerns novel graft copolymers as new compositions of matter. It further relates to a method for the preparation of these graft copolymers.

The present invention deals with graft copolymers in which specific monomers are grafted onto particular preformed polymers by means of high energy irradiation. The monomers and polymers used in this invention are known compounds and when they are used in attempted polymerization reactions by known methods, there results mixed homopolymers with substantially no graft copolymers. In contrast, by employing the teachings of this invention, there are obtained unique graft copolymers in substantially quantitative amounts.

The polymer reactants employed are soluble, thermoplastic, substantially linear poly(alkyl acrylates), in which the alkyl portion contains no more than about eighteen carbon atoms, preferably no more than eight carbon atoms. While the alkyl portion may exhibit any of the known spatial configurations, including cyclic and acyclic structures, it is preferred to use those alkyl groups having a primary or secondary, that is non-tertiary, carbon atom attached directly to the adjacent oxygen atom. It is quite satisfactory for tertiary carbon atoms to be present in the alkyl group, but it is preferred that a tertiary carbon atom is not joined directly to the oxygen atom to which the alkyl group is attached.

The polymer reactant employed serves as the backbone of the subject graft copolymers, that is, it is the chain onto which the monomer reactant is grafted. It is the critical cooperative reaction between the specific polymer and monomer reactants of this invention that, under the present reaction conditions to be explained hereinafter, produces the unexpectedly advantageous results of this invention. The polymer reactant must be one of the defined poly(alkyl acrylates) in order for the desired results to be obtained. The corresponding poly(alkyl methacrylates) do not function according to the present teachings and are, therefore, not within the compass of the invention.

Typical of the soluble, thermoplastic, linear polymers that may be utilized include those that are prepared from alkyl acrylates such as methyl acrylate, ethyl acrylate, propyl acrylate, isopropyl acrylate, butyl acrylate, pentyl acrylate, cyclopentyl acrylate, hexyl acrylate, isohexyl acrylate, cyclohexyl acrylate, 2-ethylhexyl acrylate, octyl acrylate, 2,2,4-trimethylhexyl acrylate, nonyl acrylate, decyl acrylate, isodecyl acrylate, dodecyl acrylate, tetradecyl acrylate, octadecyl acrylate, and mixtures, which, of course, give copolymers of two or more thereof.

The polymer reactants of this invention may have molecular weights in the range of about 1,000 to 5,000,000, preferably 10,000 to 1,000,000. These molecular weights refer to number average values.

The monomer reactant is grafted onto the polymer backbone, as stated previously, under the initiation of high energy irradiation, to be more fully discussed hereinafter. The monomer reactant is restricted as to identity, since not all monomers capable of polymerization according to conventional free radical methods can be used in the present graft copolymerization. The present monomers must wet and swell the polymer backbone. The polymer backbone should preferably be or become soluble in the monomer. Suitable for use as the monomer reactant are alkyl acrylates in which the alkyl portion contains no more than eighteen carbon atoms, preferably no more than eight carbon atoms; alkyl methacrylates in which the alkyl portion contains no more than eighteen carbon atoms, preferably no more than eight carbon atoms; acrylonitrile; acrylic acid; styrene and ring substituted styrenes containing no more than a total of about twenty carbon atoms; hydroxysubstituted alkyl vinyl ethers in which one or two hydroxy groups may be attached to an alkylene chain of two to eighteen carbon atoms and in which no hydroxy group is closer to the ether oxygen than two carbon atoms, and in which, if there are two hydroxy groups, such groups are on different carbon atoms; alkanamidoalkyl vinyl ethers in which the non-vinyl portion contains from three to twenty-three carbon atoms; vinyl alkyl sulfides in which the alkyl portion contains no more than eighteen carbon atoms and in which portion there may be one or two hydroxy substituents provided no hydroxy substituent is nearer to the sulfur atom than two carbons and if two hydroxy substituents are present they are no different carbon atoms; dialkylaminoalkyl vinyl sulfides in which the dialkyl portion attached to the amino nitrogen considered individually may contain up to about eight carbon atoms and considered collectively may form a five- to six-membered heterocyclic amino group with the amino nitrogen atom, and in which the nitrogen atom is always tertiary and is connected to the sulfur atom by means of an alkylene group containing from two to eighteen carbon atoms; N-vinyl lactams and alkyl substituted N-vinyl lactams preferably containing from six to twenty carbon atoms; alkyl vinyl sulfones in which the alkyl portion contains up to about eighteen carbon atoms; N-vinylakyleneureas containing from five to twelve carbon atoms; and N-vinyl N'-aminoalkylalkyleneureas containing from seven to twenty carbon atoms. In the above monomers, the alkyl groups may exhibit any possible spatial configurations such as normal, iso, or tertiary. These alkyl groups may be acyclic or cyclic, including alkyl substituted cyclic, as long as the total carbon content conforms to the defined amount. In the hydroxy substituted compounds the hydroxy group or groups may be attached at any possible location as long as the previous definition is adhered to. In the ring substituted styrenes the substituents may occupy any possible ring location or locations and when the substituents are alkyl groups they may have any possible spatial configuration.

Typical of the monomer reactants that may be employed are methyl acrylate, isopropyl acrylate, cyclopentyl acrylate, 2-ethylhexyl acrylate, decyl acrylate, dodecyl acrylate, octadecyl acrylate, methyl methacrylate, tert-butyl methacrylate, cyclohexyl methacrylate, octyl methacrylate, undecylmethacrylate, octadecyl methacrylate, acrylonitrile, acrylic acid, styrene, p-butylstyrene, p-octylstyrene, o-chlorostyrene, o,p-dipropylstyrene, o-methyl-p-decylstyrene hydroxyethyl vinyl ether, hydroxyoctyl vinyl ether, dihydroxydodecyl vinyl ether, formamidoethyl vinyl ether, butanamidodecyl vinyl ether, acetamidooctadecyl vinyl ether, butyl vinyl sulfide, hydroxybutyl vinyl sulfide, octyl vinyl sulfide, octadecyl vinyl sulfide, dimethylaminoethyl vinyl sulfide, diethylaminodecyl vinyl sulfide, morpholinopentyl vinyl sulfide, pyrolidinyloctyl vinyl sulfide, piperidinodecyl vinyl sulfide, N-vinyl-2-pyrrolidone, N-vinyl - 5 - methyl - 2 - pyrrolidone, N-vinyl-4,4-diethyl-2-pyrrolidone, N-vinyl-4-butyl-5-octyl-2-pyrrolidone, N - vinyl-6-methyl-2-piperidone, N-vinyl-6-octyl-2-piperidone, N-vinyl-2,2,6,6-tetramethyl-4-piperidone, N-vinyl- 2 - oxohexamethylenimine, N-vinyl-5,5-dimethyl-2-oxohexamethylenimine, N-vinyl-4-butyl-5-octyl-2-oxohexamethylenimine, methyl vinyl sulfone, isobutyl vinyl sulfone, tert-octyl vinyl sulfone, dodecyl vinyl sulfone, octadecyl vinylsulfone, N-vinylethyleneurea, N-vinyltrimethyleneurea, N-vinyl-1,2-propyleneurea, N-vinylbutyleneurea, N-vinyl-N'-aminoethylethyleneurea, and N-vinyl-N'-dibutylaminododecylethyleneurea.

It is preferred to employ pure monomers, when possible. The presence of small amounts of inhibitors in commercially available monomers, while not desirable since the efficiency of graft copolymerization may be slightly decreased, is not especially objectionable. If feasible, particularly from an economic viewpoint, the monomer is undesirably purified, especially if a high purity product is required.

The monomer reactants are grafted onto the polymer backbone and, thereby, form side chains that have molecular weights in the range of at least 1,000, usually considerably higher even up to 1,000,000 and over. Grafted chains of this magnitude are not possible by prior methods and such chains contribute to the unique structure and advantageous properties of the present graft copolymers.

The polymers and monomers of this invention may be reacted in a wide range of proportions. It is generally the best practice to employ at least 10% by weight of either the polymer and monomer and, of course, no more than 90% of the other. More practical ranges are at least 20% of one and no more than 80% of the other, with a range of 35 to 65% of one and 65 to 35% of the other preferred. It is relatively immaterial whether the monomer or polymer predominates in the reaction system and graft copolymer product, although, of course, some gradation of properties is observable. It is recommended that no less than about 10% of the backbone or polymer reactant be employed, since in amounts appreciably less than that, a competing homopolymerization reaction tends to complicate and minimize the benefits of the instant graft copolymerization. Correspondingly, if appreciably more than 90% of the backbone is used it tends to suffer from degradation and, possibly, other undesirable reactions which alter the characteristics of the product. Although the present graft copolymerization does occur appreciably outside of the broadest component range defined, other competing reactions tend to predominate and substantially curtail the benefits of this invention. Therefore, such excluded proportions of reactants should be avoided. All proportions of reactants within the defined ranges, set forth above, produce valuable products of this invention.

The present graft copolymerization is initiated by high energy irradiation. Suitable as sources of high energy irradiation are radioactive materials and electron accelerators. Useful as radioactive materials that supply gamma rays are irradiated isotopes such as $Co^{60}$, fission products such as $Cs^{137}$, adjuncts to fission reactions such as radioactive xenon, and the like. A $Co^{60}$ source is particularly effective. Useful as radioactive materials that supply beta rays are $Sr^{90}$ and the like. Valuable as electron accelerators, which supply beta rays, are the Van de Graaff generator, the resonant transformer, and the like. These electron accelerators as sources of high energy irradiation are growing in importance because of availability and economic advantages. Nevertheless, either radioactive materials or electron accelerators may be used with substantially equal success.

The important consideration involving the use of high energy irradiation is the amount or quantity to which the polymer-monomer system is exposed. The irradiation quantity or dose is a product of intensity and time and is conveniently measured in REP's (roentgen-equivalent-physical). A REP is equivalent to the ionization produced by the absorption of 93 ergs of energy per gram of irradiated substance. The quantities or dosages useful in the present instance range from 10,000 to 10,000,000 REP's, with 500,000 to 2,000,000 REP's preferred. Actually the range of dosages is limited on the lower side only by the lowest practical measurable amount, which is at about 10,000 REP's. At this figure the conversion is not very high, but, nonetheless, a graft copolymerization of this invention occurs in appreciable amounts. The range of dosages is limited on the higher side by the necessity of obviating undesirable degradation of the polymer backbone or cross-linking of the graft copolymer product. These undesirable effects usually do not occur until the dosage exceeds considerably 10,000,000 REP's although, of course, the exact figures will vary somewhat with the particular polymer and monomer system. A consistently practical efficient range of dosages is 500,000 to 2,000,000 REP's, and such is, therefore, preferred.

The sources of high energy irradiation produce gamma and/or beta rays as indicated in amounts known or capable of calculation. One then selects a desired dosage and by knowing the strength of the source can determine the time of exposure. For instance, if a source irradiates energy at the rate of 150,000 REP's per hour and a dosage of 1,500,000 REP's is desired, the polymer-monomer system is irradiated for 10 hours. Similarly, for a source calibrated at 250,000 REP's per hour and a desired dosage of 125,000 REP's, the time of irradiation is one-half hour.

By employing the polymers and monomers of this invention under the conditions of irradiation just discussed it is possible to produce valuable graft copolymers in a way unknown heretofore. These results are surprising since the monomers alone under the initiation of high energy irradiation homopolymerize quite readily. For some reason not clearly understood, the monomers of this invention in the presence of the instant polymers prefer to attach themselves to the preformed polymer backbone when initiated by the method of this invention, to form the unique graft copolymers of this invention.

For example, there is prepared, by free radical polymerization using azodiisobutyronitrile as a catalyst, a backbone polymer of butyl acrylate having a number average molecular weight of 780,000. This poly(butyl acrylate) backbone is mixed with methyl methacrylate in a one-to-one weight ratio and exposed to irradiation from a calibrated $Co^{60}$ source at 30° C. The dosage to which the reactants are exposed is 2,000,000 REP's. The graft copolymer product is extracted first with ether (a poor solvent for butyl acrylate homopolymer and a non-solvent for the graft copolymer) and then with acetonitrile (a poor solvent for methyl methacrylate and a non-solvent for the graft copoylmer). This method indicates that about 94% of the methyl methacrylate is chemically united to about 92% of the poly(butyl acrylate) to form the graft copolymer of this invention. There results a graft copolymer of this invention that is a white, translucent, tough flexible resin. Similarly, there is prepared a graft copolymer by irradiating from a $Co^{60}$ source at 45° C. at a dosage of 1,000,000 REP's, a mixture of 50 parts of poly(ethyl acrylate) and 25 parts of 2-ethylhexyl acrylate. Under like conditions, there are made graft copolymers from a mixture of 45 parts of poly(tetradecyl acrylate) and 15 parts of acrylic acid, a mixture of 48 parts of poly(octyl acrylate) and 36 parts of tert-butyl vinyl sulfide, and a mixture of 56 parts of poly(decyl acrylate) and 7 parts of N-vinylpyrrolidone. In like manner, using a $Co^{60}$ source at 60° C. and a dosage of 1,500,000 REP's, there is made a useful fiber-forming graft copolymer of this invention from a mixture of 16 parts of poly(propyl acrylate) and 40 parts of acrylonitrile. A graft copolymer is formed by irradiating a mixture of 54 parts of poly(octadecyl acrylate) and 45 parts of styrene from a Co$^{60}$ source at 88° C. at a dosage of 750,000 REP's. Similar results are obtained by employing the other monomer and preformed polymer reactants of this invention at the same or other temperatures and dosages of this invention using the same or other sources of irradiation of this invention.

The graft copolymerization may be conducted on a practical basis in the range of about −70° to 100° C., with 0° to 70° C. preferred. Temperatures greater than 100° C. may be employed but appreciably higher values may lead to the hindrance or predominance of reactions other than the desired one. Within the temperature ranges set forth above, which are the practical ones, the present reaction must be conducted at temperatures above the lowest of the glass points of the polymer reactant and the copolymerization product and below the temperature at which thermal homopolymerization of the monomer predominates.

The glass temperature or apparent second order transition temperature is that temperature at which the first derivative of thermodynamic variables, such as coefficient of expansion, specific volume, or heat capacity, undergoes a sudden change. This transition temperature is observed as an inflection temperature which is conveniently found by plotting the log of the modulus of rigidity against temperature. A suitable method for determining such modulus and transition temperature is described by Williamson in British Plastics 23, 87–90.

In the present case, the polymer reactant has one transition temperature and the copolymer product generally exhibits two transition temperatures. These two transition temperatures are generally somewhat lower than the transition temperatures found for the corresponding component as a homopolymer. However, as a first approximation for the determination of operating temperatures, the transition temperatures of the homopolymers can be used. It is the lowest transition temperature that is important for the instant purposes. Should the present graft copolymerization be attempted at or below the lowest of the glass temperatures, very little, if any, reaction would occur. Once above this lowest glass temperature the graft copolymerization progresses satisfactorily. It is preferred, when practical or not otherwise limited, to conduct the instant reaction above the higher or the two transition or glass temperatures of the graft copolymer.

The glass or transition temperatures, of course, vary from system to system, depending on the particular polymers and monomers employed, but these temperatures have specific values that are known or readily determined by known methods. Typical of the lower and upper of these transition temperatures for the graft copolymers, which may be symbolized as $Tg$, are tabulated in Table I as follows:

TABLE I

*Approximate transition temperatures of graft copolymers*

| Starting Components | Lower $Tg$, ° C. | Upper $Tg$, ° C. |
| --- | --- | --- |
| poly(methyl acrylate)-decyl methacrylate | −30 | 3 |
| poly(ethyl acrylate)-butyl methacrylate | −23 | 17 |
| poly(butyl acrylate)-hexyl methacrylate | −52 | −6 |
| poly(isobutyl acrylate)-hexyl methacrylate | −24 | −6 |
| poly(octyl acrylate)-tetradecyl methacrylate | −65 | −9 |
| poly(2-ethylhexyl acrylate)-tetradecyl methacrylate | −55 | −9 |
| poly(dodecyl acrylate)-decyl methacrylate | −3 | −30 |
| poly(nonyl acrylate)-methyl methacrylate | −58 | 105 |
| poly(tetradecyl acrylate)-pentyl methacrylate | 3 | 23 |
| poly(hexadecyl acrylate)-ethyl methacrylate | 35 | 47 |
| poly(hexadecylacrylate)-propyl methacrylate | 33 | 35 |

Referring to Table I, it is apparent that a poly(methyl acrylate) and decyl methacrylate mixture should be irradiated at temperatures above −30° C. and it will most conveniently undergo graft copolymerization at temperatures above about 3° C. Similarly, butyl methacrylate will graft copolymerize onto poly(ethyl acrylate) above −23° C. and especially favorably above 17° C. It can be seen that the temperature difference between the lower and higher $Tg$ values varies with the particular graft copolymers which are formed from the polymer-monomer mixtures. For instance, the difference between the two $Tg$ temperatures of the graft copolymer product in the poly(octyl acrylate)-tetradecyl methacrylate system is 56° C., while in the poly(hexadecyl acrylate)-propyl methacrylate system the difference is only 2° C. This indicates that in the former instance, it is necessary to increase the temperature about 56° C. in going from the temperature at which the graft copolymerization appreciably starts to the temperature at which it is preferably conducted, whereas in the latter instance the starting and preferable temperatures are only 2° C. apart. The $Tg$ values of the other polymer-monomer systems of this invention are known or capable of determination.

The temperature at which thermal homopolymerization of the monomer predominates is that temperature at which the monomers of this invention apparently preferentially undergo homopolymerization rather than the desired graft copolymerization. Therefore, in order to obtain advantageous results in the present instances, the reacting temperature should be maintained at a point no higher than just below the point at which appreciable thermal homopolymerization occurs. The point at and above which thermal horopolymerization is favored is generally known or readily determined by known methods for the monomers of this invention. Typical and illustrative of the temperatures at and above which thermal homopolymerization of the present monomers predominates include: lower alkyl acrylates—about 50° C.; lower alkyl methacrylates—about 80° C.; and styrene—about 100° C.

The definition of the operative temperature ranges in terms of $Tg$ values and predominance of thermal homopolymerization will be clear, complete, and definite to one skilled in the art and will be recognized as an accurate way to set forth the desired temperatures since the actual numerical values of degrees of temperature will vary somewhat from reactant to reactant and from system to system as the case may be. Nevertheless, these temperature definitions under consideration are fixed and definite and occupy in the scientific realm a category similar to freezing points, boiling points, and the like.

Anaerobic conditions, that is the absence of oxygen, are preferred in the present method. While the instant reaction progresses in the presence or absence of oxygen, it is preferred substantially to eliminate any contact between oxygen and the reaction system because sometimes with oxygen present there develop some complexities not entirely desirable.

There may be employed, if desired, an inert, organic diluent, preferably volatile. Inert in the present sense means non-reactive to the polymer-monomer reactants and substantially non-sensitive to irradiation. By and large a diluent is not needed, but occasionally such is desirable for reasons of convenience since normally heavily-viscous systems are more easily handled if a diluent is used. Also, in some instances it may be desirable to use the graft copolymeric product from a solution such as when it is employed as a coating. Suitable for use as a diluent are benzene, toluene, xylene, and the like. After the communication of the reaction the diluent may be readily removed by evaporation, preferably under reduced pressure, if desired.

The graft copolymer products of this invention are stable, white, translucent to opaque resins that are tough, durable, and of high impact strength. Surprisingly, these resin products exhibit torsional modulus constancy over appreciable temperature ranges, which makes them available for a wide range of novel applications. This torsional modulus constancy is demonstrated by the fact that over a considerable temperature range between the two glass temperatures of the graft copolymers these products have good form stability plus high impact strength. An ordinary copolymer would possess either characteristic, but not both, and would exhibit a sharp transition at a point intermediate the two glass temperatures.

The subject resins may be molded, cast and extruded into toys, automobile accessories, advertising signs, and the like. They may also be used as coatings for wood, metal, leather, and the like, in which applications they exhibit marked superiority over mixed polymers. Normally, when the use of polymers for coatings is contemplated, a mixture of polymers, containing a blend of desired properties, is employed and applied from a prepared solution. Usually, however, the polymers stratify on drying, thus minimizing and generally eliminating any possible benefits from the combination of the polymers with the desired properties. Here, since a homogeneous product is concerned, there can be no deterrent stratification.

By the present method, it is possible, by selecting a desired concomitance of properties, to graft a soft monomer onto a hard polymer, or a hard monomer onto a soft polymer, or a monomer with a specific desired property onto a polymer with a similar or a different desired property to obtain a stable resin that contains desired modified properties in a way not possibe heretofore.

The present graft copolymers are useful as oil additives for increasing the viscosity, for improving the viscosity index, and for lowering the pour point of wax-containing lubricating oils and other petroleum products such as fuel oils and Diesel fuels. Many of the instant products form valuable high melting fibers that may be dyed, particularly when the monomer reactant is acrylonitrile.

The products of this invention are novel, stable resins that are produced in high, substantially quantitative, yields. By the present method, desirable soluble products are obtained that are formed by graft copolymerization, with substantially no cross-linking, in a way previously unknown. Because of the high, substantially quantitative yields, there is generally no need for purifying the product. If such is desired, selective solvents may be employed such as acetonitrile, diethyl ether, benzene, and the like. Identification of the products as graft copolymers may be substantiated by known selective solvent methods.

We claim:

1. A method for the preparation of a graft copolymer of 10 to 90% by weight of a poly(alkyl acrylate), in which the alkyl portion contains no more than eighteen carbon atoms, and 90 to 10% by weight of a monomer from the group consisting of alkyl acrylates and methacrylates in which the alkyl portion contains no more than eighteen carbon atoms, acrylonitrile, acrylic acid, styrene, ring substituted styrenes containing no more than a total of twenty carbon atoms, hydroxysubstituted alkyl vinyl ethers in which the alkyl portion contains from two to eighteen carbon atoms and in which there are one to two hydroxy groups on said alkyl portion but never more than one hydroxy group on any one carbon atom and no hydroxy group is closer than two carbon atoms to the ether oxygen, alkanamidoalkyl vinyl ethers in which the non-vinyl portion contains from three to twenty-three carbon atoms, vinyl alkyl sulfides in which the alkyl portion contains no more than eighteen carbon atoms, hydroxysubstitutedalkyl vinyl sulfides in which the alkyl portion contains from two to eighteen carbon atoms and in which there are one to two hydroxy groups on said alkyl portion but never more than one hydroxy group on any one carbon atom and no hydroxy group is closer than two carbon atoms to the sulfur atom, dialkylaminoalkyl vinyl sulfides in which the dialkyl portion considered individually contains up to about eight carbon atoms and collectively forms a five- to six-membered heterocyclic amino group with the amino nitrogen atom and in which said amino nitrogen atom is connected to the sulfur atom by means of an alkylene group of two to eighteen carbon atoms, N-vinyl lactams and alkylsubstituted N-vinyl lactams containing from six to twenty carbon atoms, alkyl vinyl sulfones in which the alkyl portion contains no more than eighteen carbon atoms, N-vinylalkyleneureas containing from five to twelve carbon atoms, and N-vinyl-N'-aminoalkylalkyleneureas containing from seven to twenty carbon atoms, which comprises graft copolymerizing said poly(alkyl acrylate) and said monomer by exposure of the polymer and monomer substantially simultaneously to 10,000 to 10,000,000 REP's of high energy irradiation in the temperature range of −70° to 100° C.

2. A method for the preparation of a graft copolymer of 20 to 80% by weight of a poly(alkyl acrylate), in which the alkyl portion contains no more than eighteen carbon atoms, and 80 to 20% by weight of a monomer from the group consisting of alkyl acrylates and methacrylates in which the alkyl portion contains no more than eighteen carbon atoms, acrylonitrile, acrylic acid, styrene, ring substituted styrenes containing no more than a total of twenty carbon atoms, hydroxysubstituted alkyl vinyl ethers in which the alkyl portion contains from two to eighteen carbon atoms and in which there are one to two hydroxy groups on said alkyl portion but never more than one hydroxy group on any one carbon atom and no hydroxy group is closer than two carbon atoms to the ether oxygen, alkanamidoalkyl vinyl ethers in which the non-vinyl portion contains from three to twenty-three carbon atoms, vinyl alkyl sulfides in which the alkyl portion contains no more than eighteen carbon atoms, hydroxysubstitutedalkyl vinyl sulfides in which the alkyl portion contains from two to eighteen carbon atoms and in which there are one to two hydroxy groups on said alkyl portion but never more than one hydroxy group on any one carbon atom and no hydroxy group is closer than two carbon atoms to the sulfur atom, dialkylaminoalkyl vinyl sulfides in which the dialkyl portion considered individually contains up to about eight carbon atoms and collectively forms a five- to six-membered heterocyclic amino group with the amino nitrogen atom and in which said amino nitrogen atom is connected to the sulfur atom by means of an alkylene group of two to eighteen carbon atoms, N-vinyl lactams and alkylsubstituted N-vinyl lactams containing from six to twenty carbon atoms, alkyl vinyl sulfones in which the alkyl portion contains no more than eighteen carbon atoms, N-vinylalkyleneureas containing from five to twelve carbon atoms, and N-vinyl-N'-aminoalkylalkyleneureas containing from seven to twenty carbon atoms, which comprises graft copolymerizing said poly(alkyl acrylate) and said monomer by exposure of the polymer and monomer substantially simultaneously to 500,000 to 2,000,000 REP's of high energy irradiation in the temperature range of 0° to 70° C.

3. A method for the preparation of a graft copolymer of 35 to 65% by weight in the presence of a volatile inert organic diluent of a poly(alkyl acrylate), in which the alkyl portion contains no more than eighteen carbon atoms, and 65 to 35% by weight of a monomer from the group consisting of alkyl acrylates and methacrylates in which the alkyl portion contains no more than eighteen carbon atoms, acrylonitrile, acrylic acid, styrene, ring substituted styrenes containing no more than a total of twenty carbon atoms, hydroxysubstituted alkyl vinyl ethers in which the alkyl portion contains from two to eighteen carbon atoms and in which there are one to two hydroxy groups on said alkyl portion but never more than one hydroxy group on any one carbon atom and no hydroxy group is closer than two carbon atoms to the ether oxygen, alkanamidoalkyl vinyl ethers in which the non-vinyl portions contains from three to twenty-three carbon atoms, vinyl alkyl sulfides in which the alkyl portion contains no more than eighteen carbon atoms, hydroxysubstitutedalkyl vinyl sulfiides in which the alkyl portion contains from two to eighteen carbon atoms and in which there are one to two hydroxy groups on said alkyl portion but never more than one hydroxy group on any one carbon atom and no hydroxy group is closer than two carbon atoms to the sulfur atom, dialkylaminoalkyl vinyl sulfides in which the dialkyl portion considered individually contains up to about eight carbon atoms and collectively forms a five- to six-membered heterocyclic amino group with the amino nitrogen atom and in which said amino nitrogen atom is connected to the sulfur atom by means of an alkylene group of two to eighteen carbon atoms, N-vinyl lactams and alkylsubstituted N-vinyl lactams containing from six to twenty carbon atoms, alkyl vinyl sulfones in which the alkyl portion contains no more than eighteen carbon atoms, N-vinylalkyleneureas containing from five to twelve carbon atoms, and N-vinyl-N'-aminoalkylalkyleneureas containing from seven to twenty carbon atoms, which comprises graft copolymerizing said poly(alkyl acrylate) and said monomer by exposure of the polymer and monomer substantially simultaneously to 500,000 to 2,000,000 REP's of high energy irradiation in the temperature range of 0° to 70° C.

4. A method for the preparation of a graft copolymer which comprises graft copolymerizing a poly(alkyl acrylate), in which the alkyl portion contains no more than eighteen carbon atoms, with an alkyl acrylate, in which the alkyl portion contains no more than eighteen carbon atoms, by exposure of the polymer and monomer substantially simultaneously to 500,000 to 2,000,000 REP's of high energy irradiation in the temperature range of 0° to 70° C., the polymer being present in the amount of 10 to 90% by weight and the monomer being present in the amount of 90 to 10% by weight.

5. A method for the preparation of a graft copolymer which comprises graft copolymerizing a poly(alkyl acrylate), in which the alkyl portion contains no more than eighteen carbon atoms, with an alkyl methacrylate, in which the alkyl portion contains no more than eighteen carbon atoms, by exposure of the polymer and monomer substantially simultaneously to 500,000 to 2,000,000 REP's of high energy irradiation in the temperature range of 0° to 70° C., the polymer being present in the amount of 10 to 90% by weight and the monomer being present in the amount of 90 to 10% by weight.

6. A method for the preparation of a graft copolymer which comprises graft copolymerizing a poly(alkyl acrylate), in which the alkyl portion contains no more than eighteen carbon atoms, with acrylonitrile, by exposure of the polymer and monomer substantially simultaneously to 500,000 to 2,000,000 REP's of high energy irradiation in the temperature range of 0° to 70° C., the polymer being present in the amount of 10 to 90% by weight and the monomer being present in the amount of 90 to 10% by weight.

7. A method for the preparation of a graft copolymer which comprises graft copolymerizing a poly(alkyl acrylate), in which the alkyl portion contains no more than eighteen carbon atoms, with styrene, by exposure of the polymer and monomer substantially simultaneously to 500,000 to 2,000,000 REP's of high energy irradiation in the temperature range of 0° to 70° C., the polymer being present in the amount of 10 to 90% by weight and the monomer being present in the amount of 90 to 10% by weight.

8. A method for the preparation of a graft copolymer which comprises graft copolymerizing a poly(alkyl acrylate), in which the alkyl portion contains no more than eighteen carbon atoms and vinyl alkyl sulfides in which the alkyl portion contains no more than eighteen carbon atoms, by exposure of the polymer and monomer substantially simultaneously to 500,000 to 2,000,000 REP's of high energy irradiation in the temperature range of 0° to 70° C., the polymer being present in the amount of 10 to 90% by weight and the monomer being present in the amount of 90 to 10% by weight.

References Cited in the file of this patent

UNITED STATES PATENTS

| 2,610,962 | Smyers et al. | Sept. 16, 1952 |
| 2,666,025 | Nozaki | Jan. 12, 1954 |
| 2,716,633 | Engelhart et al. | Aug. 30, 1955 |
| 2,735,830 | Coover | Feb. 21, 1956 |

OTHER REFERENCES

Modern Plastics, vol. 32 (June 1955), No. 10, pp. 159 and 252; Nature, vol. 172 (July 11, 1953), p. 76.